(12) United States Patent
Xthona et al.

(10) Patent No.: US 9,721,328 B2
(45) Date of Patent: Aug. 1, 2017

(54) METHOD TO ENHANCE CONTRAST WITH REDUCED VISUAL ARTIFACTS

(71) Applicant: Barco N.V., Kortrijk (BE)

(72) Inventors: Albert Xthona, Beaverton, OR (US); David Qualman, Beaverton, OR (US)

(73) Assignee: Barco N.V., Kortrijk (BE)

( * ) Notice: Subject to any disclaimer, the term of this patent is extended or adjusted under 35 U.S.C. 154(b) by 11 days.

(21) Appl. No.: 14/859,982

(22) Filed: Sep. 21, 2015

(65) Prior Publication Data
US 2016/0086314 A1   Mar. 24, 2016

Related U.S. Application Data

(60) Provisional application No. 62/052,826, filed on Sep. 19, 2014.

(51) Int. Cl.
| | |
|---|---|
| G06T 5/00 | (2006.01) |
| H04N 1/60 | (2006.01) |
| G06T 7/90 | (2017.01) |

(52) U.S. Cl.
CPC .......... G06T 5/00 (2013.01); G06T 5/008 (2013.01); G06T 7/90 (2017.01); H04N 1/6027 (2013.01); G06T 2207/10016 (2013.01); G06T 2207/10024 (2013.01)

(58) Field of Classification Search
CPC  G06T 5/00; G06T 5/008; G06T 7/408; G06T 2207/10016; G06T 2207/10024; H04N 1/6027
See application file for complete search history.

(56) References Cited

U.S. PATENT DOCUMENTS

| | | | | |
|---|---|---|---|---|
| 5,394,195 A * | 2/1995 | Herman | ............ | H04N 9/69 348/675 |
| 5,689,590 A * | 11/1997 | Shirasawa | ............ | H04N 1/60 358/518 |
| 6,990,239 B1 * | 1/2006 | Nelson | ............ | G06K 9/56 382/103 |
| 8,134,532 B2 * | 3/2012 | Baba | ............ | G09G 3/3406 345/102 |
| 8,413,903 B1 * | 4/2013 | Dhua | ............ | G06K 7/1439 235/462.09 |
| 8,942,476 B1 * | 1/2015 | Rangaswamy | ...... | G06K 9/4652 382/167 |
| 2001/0055122 A1 * | 12/2001 | Nagarajan | ......... | G06T 5/40 358/1.9 |
| 2008/0247670 A1 * | 10/2008 | Tam | ............ | G06T 7/0051 382/298 |
| 2010/0074521 A1 * | 3/2010 | Gomi | ............ | H04N 13/0018 382/167 |
| 2012/0026404 A1 * | 2/2012 | Hou | ............ | H04N 9/68 348/645 |
| 2013/0328907 A1 * | 12/2013 | Ballestad | ............ | H04N 1/6027 345/590 |

* cited by examiner

*Primary Examiner* — Yubin Hung
(74) *Attorney, Agent, or Firm* — Renner, Otto, Boisselle & Sklar, LLP; Grant Steyer

(57) ABSTRACT

A method to enhance the contrast of a set of pixels each pixels being characterized by a set of color attributes comprising the steps of: determining a first property of the set of pixels; determining a second property of the set of pixels; determining, for each pixel of the set of pixels, a first property of said pixel; and modifying the color attributes of each pixel of the set of pixels as a function of the first and second property of the set of pixels and the first property of said pixel.

14 Claims, 4 Drawing Sheets

METHOD TO ENHANCE CONTRAST WITH REDUCED VISUAL ARTIFACTS

RELATED APPLICATIONS

This application claims the benefit of U.S. Provisional Application No. 62/052,826 filed on Sep. 19, 2014, which is hereby incorporated herein by reference in its entirety.

RELATED APPLICATIONS

The present disclosures relates generally to image processing, and particularly to methods and systems for enhancing image contrast by modifying pixel color attributes.

BACKGROUND OF THE INVENTION

In medical imaging the diagnosis is usually made by radiologists. When the images are available in computer readable form (digitized), the analysis of the images may be performed while they are displayed on a video monitor. Scientists in the medical diagnostic imaging field are continuously working to improve the quality of the images, acquired by the various modalities in the field. One of the well-known methods for improving the detectability of lesions of a displayed organ is by "windowing".

Windowing describes the process of displaying the detected data by extending certain detected data ranges to fill the entire intensity range of the displayed image. For example, there are only a limited number of gray levels which may be distinguished, this being due to inherent limitations of the CRT and the human eye. Therefore, it is very important to utilize the available gray levels in the regions of data values which carry the most useful information. To illustrate, assume that a black and white system has the capability of displaying 256 gray levels. If the acquisition of data occurring during an examination of a subject results in only 86 gray levels being used that are clustered away from the lowest and the highest levels; then, only about one-third of the system's contrast display capability would be used.

Windowing is presently accomplished by using a table-look-up or look-up table(s). When displaying an image, the data is stored in a digital memory, and is read out repeatedly to refresh the video display. For that purpose special circuits are used to control the read out sequence, to synchronize the raster monitor timing, to convert the digital data into analog data, etc. These circuits are well known to those skilled in the art.

To perform the "windowing" function using table look up techniques, a translation table is stored in a memory within the electronic circuitry responsible for the display refresh. The image data, on a pixel-by-pixel basis is used as an address and applied to the memory. The corresponding gray level stored in the memory is readout and used to control the intensity of the displayed pixel. The LUT usually has two parameters: a slope and a threshold that are determined by an (human) operator. Those parameters can be adjusted using either knobs or a software user interface until the image enhancement is satisfactory.

The problem with windowing is that it introduces visual artefacts like e.g. the distribution of shades is not maintained throughout the image for which the contrast is enhanced.

There is still a need for improvements.

SUMMARY

The present disclosure provides a method for enhancing the contrast of an image while maintaining more accurate color properties of the image. In a first aspect of the disclosure, a method to enhance the contrast of a set of pixels comprises the steps of Determining a first property of the set of pixels;
Determining a second property of the set of pixels;
Determining, for each pixel of the set of pixels the first property of said pixel;
Modifying the color attributes of each pixel of the set of pixels in function of the first and second property of the set of pixels and the first property of said pixel.

The disclosed method has the benefit that taking properties of the set of pixels and at least one property of a pixel into account to modify the attributes of said pixel will enhance the contrast with less or no visual artefacts.

In a further aspect of the disclosure, the color attributes are color coordinates. It is an advantage of this aspect of the disclosure that color shades will be preserved when contrast is enhanced.

In a further aspect of the disclosure, the color coordinates are red, green and blue color components. It is an advantage of that aspect of the disclosure that operations on the color attributes can be done in an Euclidian, three dimensional space further simplifying the operations of the pixel attributes.

In another aspect of the disclosure, the first property of the set of pixels is the distance between the origin of the color coordinate system and the pixel that is closest from the origin of the color coordinate system among all the pixels of the set of pixels.

In a further aspect of the disclosure, the distance between a pixel and the origin of coordinates is evaluated by the coordinate with the highest value among the color coordinates characterizing that pixel. In other words, the first property of the set of pixels is the minimum value (Min) in the set of the highest color coordinate (max(r, g, b)) for all the pixels in the set of pixels. It is an advantage of that aspect of the invention that it simplifies the determination of the first property of the set of pixels. It may be important to simplify the determination of the parameters of the transformation to be applied to the pixels of the set of pixels in order to reduce the processing power required to enhance the contrast of a set of pixels.

In another aspect of the disclosure, the second property of the set of pixels is the distance between the origin of the color coordinate system and the pixel that is farthest from the origin of the color coordinate system among all the pixels of the set of pixels In a further aspect of the disclosure, the second property of the set of is the maximum value (Max) in the set of the highest color coordinate (max(r, g, b) for all the pixels in the set of pixels.

In another aspect of the disclosure, the first property of the pixel is the highest value (max(r, g, b)) among the color coordinates characterizing that pixel.

In a further aspect of the disclosure, the set of pixels is a subset of a larger set of pixels or image. It is an advantage of that aspect of the invention that it allows to enhance the contrast of an area of interest within the image without visual creating artefacts.

The present disclosure provides a method to enhance the contrast of a set of pixels each pixels being characterized by a set of color attributes comprising the steps of: determining a first property of the set of pixels; determining a second property of the set of pixels; determining, for each pixel of the set of pixels, a first property of said pixel; and modifying the color attributes of each pixel of the set of pixels as a function of the first and second property of the set of pixels and the first property of said pixel Alternatively or additionally, the color attributes are color coordinates.

Alternatively or additionally, the color coordinates are red, green and blue color components.

Alternatively or additionally, the first property of the set of pixels is the distance between the origin of the color coordinate system and the pixel that is closest from the origin of the color coordinate system among all the pixels of the set of pixels.

Alternatively or additionally, where the first property of the set of pixels is the minimum value (Min) in the set of the highest color coordinate (max(r, g, b)) for all the pixels in the set of pixels.

Alternatively or additionally, where the second property of the set of pixels is the distance between the origin of the color coordinate system and the pixel that is farthest from the origin of the color coordinate system among all the pixels of the set of pixels Alternatively or additionally, the second property of the set of pixels is the maximum value (Max) in the set of the highest color coordinate (max(r, g, b) for all the pixels in the set of pixels.

Alternatively or additionally, the first property of the said pixel is the value (max(r, g, b)) of the color coordinate that is highest Alternatively or additionally, the set of pixels is a subset of a larger set of pixels.

Alternatively or additionally, the set of pixels is part of an image.

Alternatively or additionally, the color attributes of each pixel of the set of pixels are modified using the following equation $$CA'=CA(L-P1)/(L(P2-P1))$$

where CA' represents the modified color attributes of each pixel, CA represents the color attributes of each pixel, L represents the first property of said pixel, P1 represents the first property of the set of pixels, P2 represents the second property of the set of pixels.

Alternatively or additionally, the contrast of the set of pixels is enhanced by expanding the range of brightness of the set of pixels to be between 0 and 1.

Alternatively or additionally, a brightness of a particular pixel is equal to the highest color coordinate value for the particular pixel.

Alternatively or additionally, the pixel of the set of pixels having the minimum brightness is set to a brightness of 0 and the pixel of the set of pixels having the maximum brightness is set to a brightness of 1.

Alternatively or additionally, the contrast of the set of pixels is enhanced by expanding the range of brightness of the set of pixels to be between a lower limit (LL) and an upper limit (UL).

Alternatively or additionally, the LL is greater than 0 and the UL is less than 1.

Alternatively or additionally, the color attributes of each pixel of the set of pixels are modified using the following equation $$CA'=(CA/L)((UL-LL)(L-P1)/(P2-P1)+LL)$$

where CA' represents the modified color attributes of each pixel, CA represents the color attributes of each pixel, L represents the first property of said pixel, P1 represents the first property of the set of pixels, and P2 represents the second property of the set of pixels.

DETAILED DESCRIPTION

Definitions, Notations and Conventions

Figure 2:
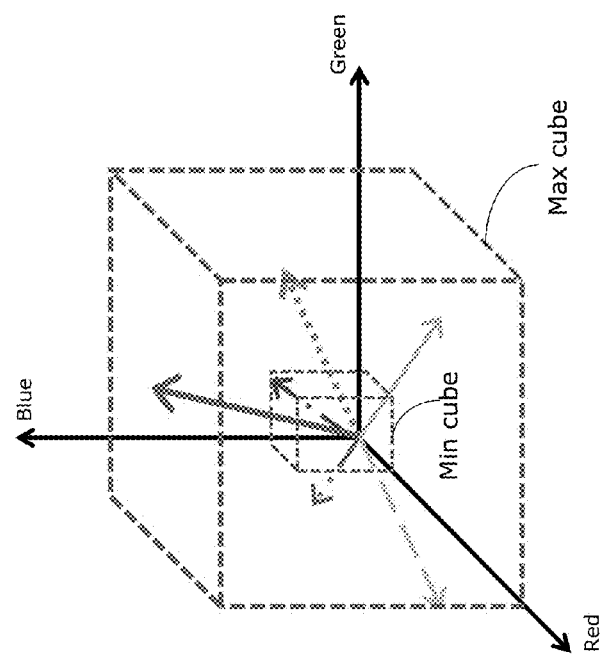
FIG. 2 shows a set of (r, g, b) triplets and the associated Minimum Cube and Maximum Cube.

Multiplication of numbers will be represented by "·", "×", "*" or simply by juxtaposing the two operands. For instance "a times b" or "a multiplied by b" can be represented by a·b; a×b; a*b or ab.

An Area of Interest (abbreviated as AOI) is a subset of an image or picture. As such an AOI is a subset of a set of pixels or picture elements composing an image or picture.

The example vectors in this disclosure are in a 3 dimensional space, but the invention may apply to space of N dimensions where N can be different from 3.

Vectors will be represented by their components between brackets or by a capitalized letter in bold. For instance <r, g, b> represents a vector with components r, g and b; R represents a vector of component Rr, Rg and Rb where Rr is the component of R on the red axis, Rg is the component of R on the green axis and Rb is the component of R on the blue axis. In the previous example, R can also be represented by <Rr, Rg, Rb>.

Scalar multiplication (of a vector by a number) will be represented by "." or simply by juxtaposing the number and the vector. For instance "a times the vector V" (where e.g. V=<V1, V2, V3> can be represented by a·V or aV or a<V1, V2, V3> or <aV1, aV2, aV3>.

The length of a vector V=<Vr, Vg, Vb> will be noted ||V|| or ||<Vr, Vg, Vb>||.

The point p with coordinates (r, g, b) corresponds to a vector <r, g, b> defined by the origin (0, 0, 0) of the cube and the point (r, g, b).

The embodiments of the invention will treat the component values of a color e.g. red, green and blue as ordinary Cartesian coordinates in a Euclidian space.

For the RGB model, this is represented by a cube using non-negative values within a 0-1 range, assigning "black" to the origin at the vertex (0, 0, 0), and with increasing intensity values running along the three axes up to "white" at the vertex (1, 1, 1), diagonally opposite black. We will refer to the cubes with vertices at (0, 0, 0); (1, 0, 0); (0, 1, 0); (1, 1, 0); (0, 0, 1); (1, 0, 1); (0, 1, 1) and (1, 1, 1) as the Color Cube.

A display is usually not able to render black (absence of light) or white. Whenever reference will be made to a black pixel, what is meant is that the pixel is characterized by the color coordinates (0, 0, 0).

Whenever reference will be made to a white pixel, what is meant is that the pixel is characterized by the color coordinates (1, 1, 1).

An RGB triplet (r, g, b) represents the three-dimensional coordinate of the point of the given color within the cube or its faces or along its edges.

Triplets that are collinear, e.g. (r, g, b) and (α·r, α·r, α·r), are shades of the same color.

In particular, if L is the luminance, any point (r, g, b) inside the color cube can be related to a point (R, G, B) on the surface of the color cube as (r, g, b)=(LR, LG, LB) where L is a real number in the interval [0,1].

In a digital display, colors are encoded as binary digits. If for instance the color components are encoded with 8 bits, the encoded number varies from 0 for the binary sequence "00000000" to 255 for the binary sequence "11111111", In the description of embodiments, all numbers have been normalized. In other words, if the colors are encoded with N bits, the components <r, g, b> with r, g and b in the interval [0, 1] are obtained by dividing the numbers encoded as N bit digits by $2^N-1$.

The invention will make use of the following results: by subtracting from a vector <r, g, b> a fraction of the same vector <r, g, b> a color can be shifted toward black and still remain collinear to the vector <r, g, b>. By multiplying the components of a vector <r, g, b> by a value greater than 1.0, the color (r, g, b) can be brightened and still remain collinear to the ray.

The brightness of a color (r, g, b) can be determined as follows.

Figure 1:
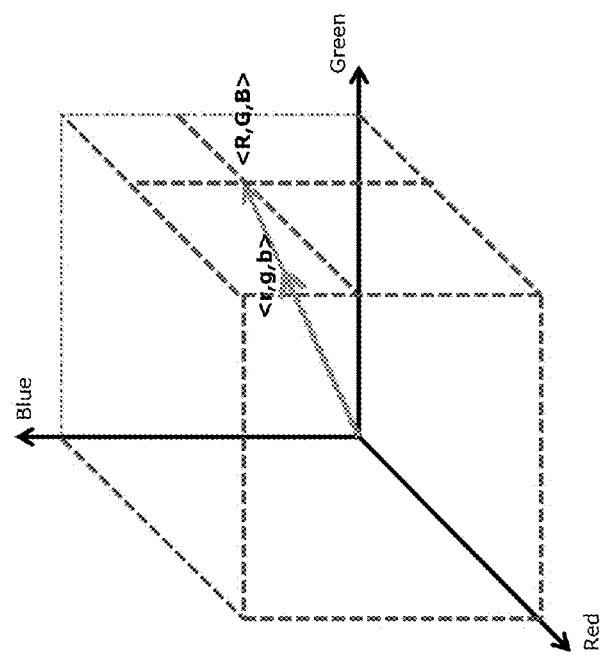
FIG. 1 shows the color cube, a vector <r, g, b> and the corresponding vector <R, G, B>.
Figure 4:
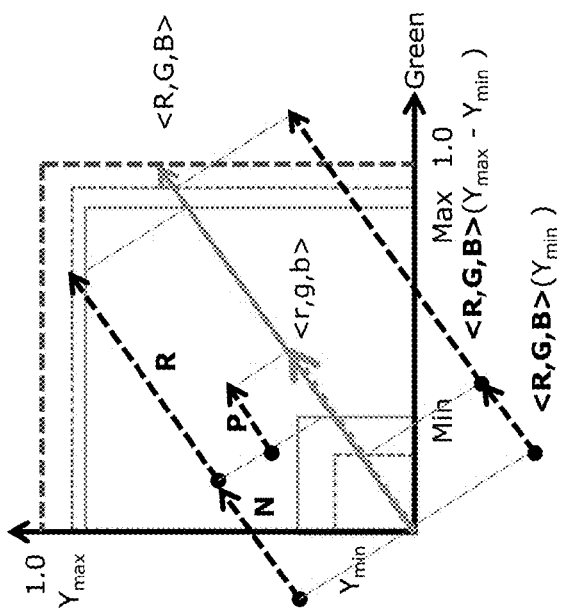
FIG. 4 shows a 2D Representation of a method for expanding the contrast to a limited range.

As shown on FIG. 1, the straight line determined by the points (0, 0, 0) and (r, g, b) intersects the cube at a point (R, G, B). The point (R, G, B) being on the surface of the color cube, at least one of the components of (R, G, B) is equal to 1. In the example of FIG. 1, it is the green component G that is equal to 1.

To project (r, g, b) on the cube, we just have to divide the components of (r, g, b) by max (r, g, b) the maximum value of the (r, g, b) triplet.

For instance, for the triplet (0.1, 0.2, 0.3); max (0.1, 0.2, 0.3) is equal to 0.3. To project the triplet (0.1, 0.2, 0.3) on the surface of the cube; we divide the components of the triplet by 0.3 (which is equivalent to say that one multiplies the components of the triplet by 1/0.3).

In vector notations, one has thus:

$$<R,G,B>=<r/\max(r,g,b),g/\max(r,g,b),b/\max(r,g,b)>=1/\max(r,g,b)*<r,g,b> \quad (1)$$

By definition, we also have:

$$<r,g,b>=L<R,G,B> \text{ where } L \text{ is the brightness, ranging from 0.0 to 1.0.} \quad (2)$$

By solving equations (1) and (2) for L, we have L=max(r, g, b).

AOI (Area Of Interest) is a set of pixels for which a contrast adjustment is to be performed. The Maximum Cube is the smallest cube that contains all the pixels of the AOI. In other words, the Maximum Cube is the smallest cube that contains all the (r, g, b) triplets associated with pixels of the AOI. At least one of the pixels of the AOI has an (r, g, b) triplet on the surface of the Maximum Cube.

For instance; as illustrated on FIG. 2, if the AOI is the set {(0.1, 0.2, 0.3); (0, 0, 0.5); (0.6, 0.2, 0.25); (0.4, 0.3, 0.7)}, then the maximum cube with summits at (0, 0, 0); (0.7, 0, 0); (0, 0.7, 0); (0.7, 0.7, 0); (0, 0, 0.7); (0.7, 0, 0.7); (0, 0.7, 0.7) and (0.7, 0.7, 0.7).

The Minimum Cube is the largest cube that does not contain any of the pixels of the AOI. In other words, the Minimum Cube is the largest cube that excludes all of the (r, g, b) triplets associated with pixels of the AOI. At least one of the pixels of the AOI has an (r, g, b) triplet on the surface of the Minimum Cube.

For instance, as illustrated on FIG. 2, the Minimum Cube is the cube with summits at (0, 0, 0); (0.1, 0, 0); (0, 0.1, 0); (0.1, 0.1, 0); (0, 0, 0.1); (0.1, 0, 0.1); (0, 0.1, 0.1) and (0.1, 0.1, 0.1).

In a more general case the Maximum Cube is the cube with summits at (0, 0, 0); (Max, 0, 0); (0, Max, 0); (Max, Max, 0); (0, 0, Max); (Max, 0, Max); (0, Max, Max) and (Max, Max, Max) and the Minimum Cube is the cube with summits at (0, 0, 0); (Min, 0, 0); (0, Min, 0); (Min, Min, 0); (0, 0, Min); (Min, 0, Min); (0, Min, Min) and (Min, Min, Min) where Max is the maximum value reached by max(r, g, b) for all pixels of the AOI and Min is the minimum value reached by max(r, g, b) for all pixels of the AOI.

Let us define the vectors N, P, and R. N, P, and R may be different for each triplet (r, g, b) of the AOI.

N is the vector that is collinear with <r, g, b> and that intersects the surface of the Minimum cube.

P is the vector difference of <r, g, b> and N: P=<r, g, b>−N. P is the vector that will be scaled to yield the "contrast enhanced" triplet for the initial triplet (r, g, b).

R is the vector collinear with <r, g, b> and N and such that the sum of R and N intersects the Maximum Cube.

<R, G, B> is the vector that is collinear with <r, g, b> and that intersects the Color Cube.

Figure 3:
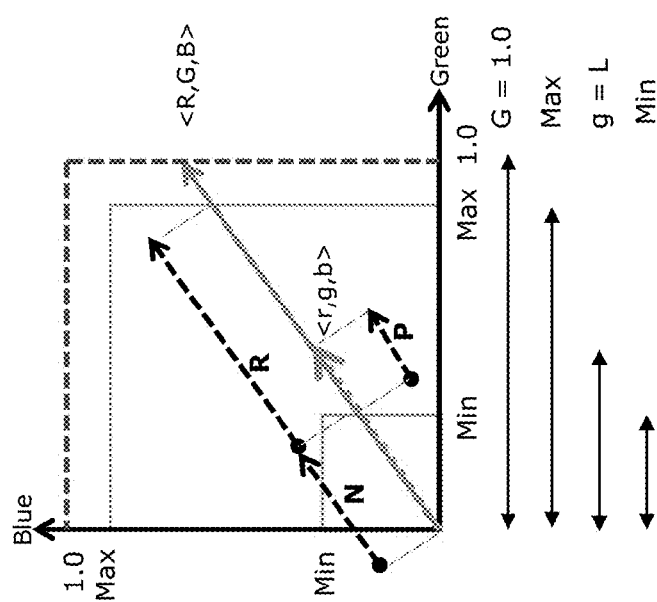
FIG. 3 shows an example of vectors N, P, R and RGB associated with a vector <r, g, b>.

A representation of N, P, R and <R, G, B> is given on FIG. 3 for a triplet (0, g, b) with a given Maximum Cube and a given Minimum Cube.

The principle of the contrast adjustment is, for each triplet (r, g, b) of the AOI:

Subtract N from <r, g, b>

Scale the result P as described below.

In order to scale P, we are solving for vector C=<r', g', b'>, such that the ratio of the length of C and the length of <R, G, B> is the same as the ratio of the length of P and the length of R:

$$\|C\|/\|<R,G,B>\|=\|P\|/\|R\| \quad (3)$$

Or $$\|R\|/\|<R,G,B>\|=\|P\|/\|C\|=1/S \text{ where } S \text{ is a real number(or a rational number if one takes into account the limitations of the digital processors used in the display).} \quad (4)$$

By (4) we have $$\|C\|=S\|P\| \quad (5)$$

And $$\|<R,G,B>\|=S\|R\| \quad (6)$$

The vectors being collinear, we can also write:

$$C=S\ P \quad (7)$$

$$<R,G,B>=S\ R \quad (8)$$

Based on FIG. 3

$$<R,G,B>=[1/(\text{Max}-\text{Min})]\cdot R \quad (9)$$

By (8) and (9) we have:

$$S=1/(\text{Max}-\text{Min}) \text{ and by (7) we have } C=[1/(\text{Max}-\text{Min})]\cdot P. \quad (10)$$

By expressing P as a function of <r, g, b>, we will have the expression of <r', g', b'> in function of <r, g, b> alone.

N being collinear with <r, g, b>, we may write:

$$N=k<r,g,b> \quad (11)$$

We also have:

$$N = \text{Min}/L \cdot \langle r,g,b \rangle \quad (12)$$

Injecting this result for N in the definition of P, we have:

$$P = \langle r,g,b \rangle - \text{Min}/L \cdot \langle r,g,b \rangle. \quad (13)$$

Which gives us:

$$P = \langle r,g,b \rangle (L-\text{Min})/L \quad (14)$$

Combining expressions (7), (10) and (14), we find:

$$\langle r',g',b' \rangle = \langle r,g,b \rangle (L-\text{Min})/[L \times (\text{Max}-\text{Min})]. \quad (15)$$

Therefore, enhancing the contrast of an Area of Interest is done according to the invention as follows:

(a) Determine the Minimum Cube or in other words determining the minimum of max (r. g. b) for all the triplets (r, g, b) associated with the pixels in the Area of Interest.

(b) Determine the Maximum Cube or in other words determining the maximum of max (r. g. b) for all the triplets (r, g, b) associated with the pixels in the Area of Interest.

(c) For each pixel and the associated triplet (r, g, b), determine max (r, g, b) which is L for that pixel.

(d) Transform the triplet (r, g, b) of the pixel into (r', g', b') where:

$$r' = r \cdot (L-\text{Min})/[L \times (\text{Max}-\text{Min})] \quad (d1)$$

$$g' = g \cdot (L-\text{Min})/[L \times (\text{Max}-\text{Min})] \quad (d2)$$

$$b' = b \cdot (L-\text{Min})/[L \times (\text{Max}-\text{Min})] \quad (d3)$$

In another embodiment, the above formula is revised when it is not desired to expand the contrast to range from black to full brightness. For example, it may be desirable to limit the minimal brightness to something greater than 0, or to limit the brightness from yielding fully saturated colors. In this case, the formula will start back at the point where the full resulting range of brightness was assumed at 0.0 to 1.0. The expanded range will be identified as $Y_{min}$ and $Y_{max}$.

For the scaling we are solving for a new point $C = \langle r',g',b' \rangle$, such that the length of C over the length of $\langle R,G,B \rangle$ is the same as the proportion of the length of P to the length of R.

Based on the new range of brightness ($Y_{max} - Y_{min}$) we can write (8) as follows:

$$\langle R,G,B \rangle (Y_{max} - Y_{min}) = SR \quad (16)$$

Based on the new minimum brightness $Y_{min}$ we also have:

$$\langle r',g',b' \rangle = SP + \langle R,G,B \rangle (Y_{min}) \quad (17)$$

We also have:

$$\langle R,G,B \rangle / (1.0 - 0.0) = R/(\text{Max}-\text{Min}) \quad (18)$$

$$S = (Y_{max} - Y_{min})/(\text{Max}-\text{Min}) \quad (19)$$

$$P = \langle r,g,b \rangle ((L-\text{Min})/L) \quad (20)$$

$$\langle r',g',b' \rangle = ((Y_{max}-Y_{max})(\text{Max}-\text{Min})\langle r,g,b \rangle (L-\text{Min})/L + \langle R,G,B \rangle (Y\text{min}) \quad (21)$$

Finally, we find that $$\langle r',g',b' \rangle = (\langle r,g,b \rangle /L)((Y_{max}-Y_{min})(L-\text{Min})/(\text{Max}-\text{Min}) + Y\text{min}) \quad (22)$$

Figure 5:
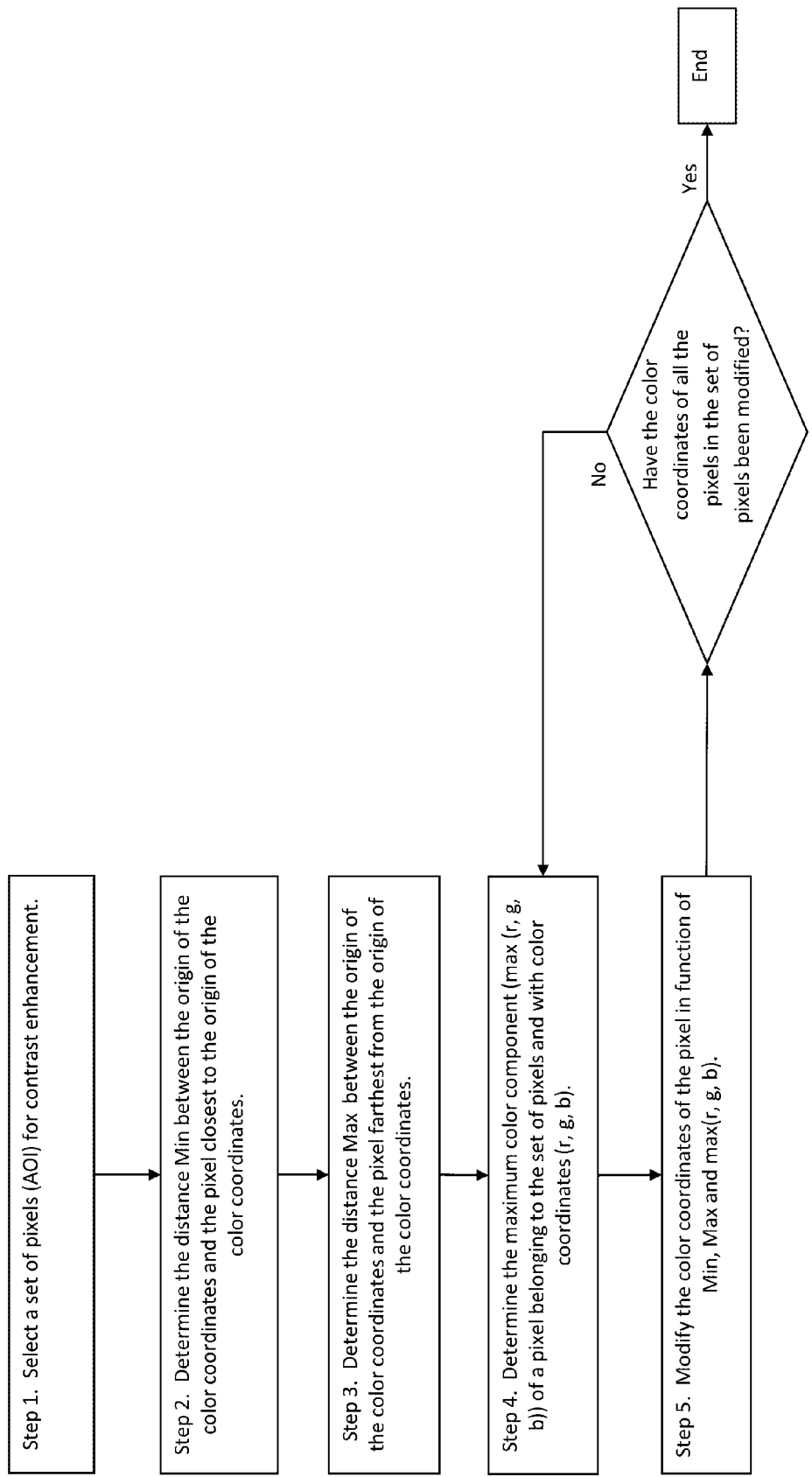
FIG. 5 shows a flow chart for a method according to the invention to enhance the contrast of a set of pixels.

FIG. 5 gives an overview of the method with a particular choice for the first and second properties of the set of pixels and the first property of the pixel.

Figure 6:
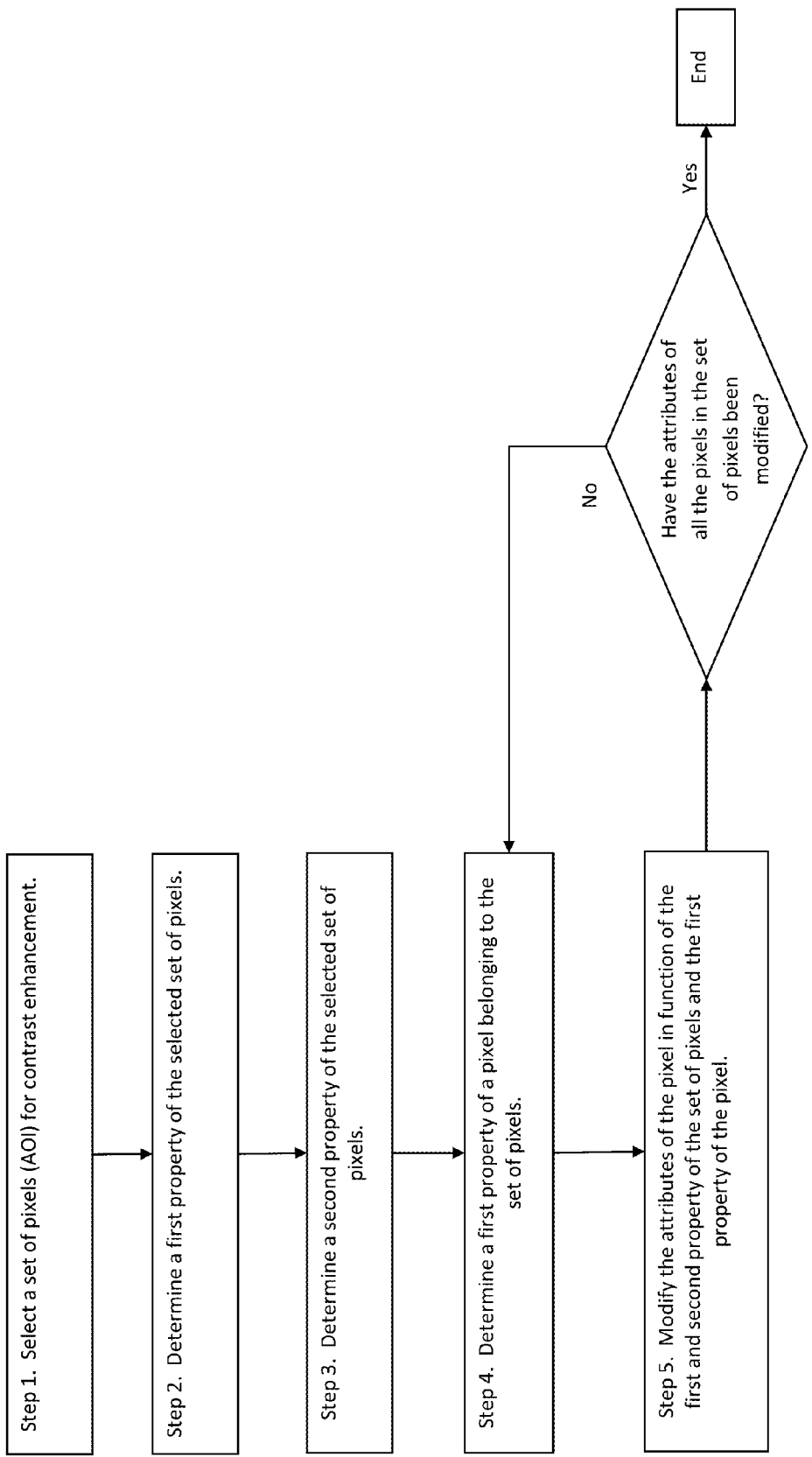
FIG. 6 shows a more generalized flow chart for a method according to the invention to enhance the contrast of a set of pixels.

FIG. 6 gives an overview of the method in a more general case i.e. without specifying the properties or parameters characterizing the set of pixels and the property or parameter of the pixel whose attributes are modified.

While the embodiments were described for a display using three primary colors, the invention can apply to displays using different sets of colors (e.g., RGBW (Red, Green, Blue, White)) or different color spaces (e.g., YUV, HSL, HSV, CMYK, or any other suitable color space).

The invention claimed is:

1. A method to enhance the contrast of a set of pixels each pixels being characterized by a set of color attributes comprising the steps of:
    determining a first property of the set of pixels;
    determining a second property of the set of pixels;
    determining, for each pixel of the set of pixels, a first property of said pixel; and
    modifying the color attributes of each pixel of the set of pixels as a function of the first and second property of the set of pixels and the first property of said pixel;
    wherein the color attributes are color coordinates and the first property of the set of pixels is the minimum value in the set of the highest color coordinate for all the pixels in the set of pixels.

2. A method according to claim 1, further characterized in that the color coordinates are red, green and blue color components.

3. A method according to claim 1, where the first property of the set of pixels is the distance between the origin of the color coordinate system and the pixel that is closest from the origin of the color coordinate system among all the pixels of the set of pixels.

4. A method according to claim 1, further characterized in that the second property of the set of pixels is the distance between the origin of the color coordinate system and the pixel that is farthest from the origin of the color coordinate system among all the pixels of the set of pixels.

5. A method according to claim 1, further characterized in that the set of pixels is a subset of a larger set of pixels.

6. A method according to claim 5 further characterized in that the set of pixels is part of an image.

7. A method according to claim 1, wherein the contrast of the set of pixels is enhanced by scaling the range of brightness of the set of pixels to be between 0 and 1.

8. A method according to claim 1, wherein a brightness of a particular pixel is equal to the highest color coordinate value for the particular pixel.

9. A method according to claim 1, wherein:
    the pixel of the set of pixels having the minimum brightness is set to a brightness of 0; and
    the pixel of the set of pixels having the maximum brightness is set to a brightness of 1.

10. A method to enhance the contrast of a set of pixels each pixels being characterized by a set of color attributes comprising the steps of:
    determining a first property of the set of pixels;
    determining a second property of the set of pixels;
    determining, for each pixel of the set of pixels, a first property of said pixel; and
    modifying the color attributes of each pixel of the set of pixels as a function of the first and second property of the set of pixels and the first property of said pixel;
    wherein the color attributes are color coordinates and the second property of the set of pixels is the maximum value in the set of the highest color coordinate for all the pixels in the set of pixels.

11. A method to enhance the contrast of a set of pixels each pixels being characterized by set of color attributes comprising the steps of:

determining a first property of the set of pixels;
determining a second property of the set of pixels;
determining, for each pixel of the set of pixels, a first property of said pixel; and
modifying the color attributes of each pixel of the set of pixels as a function of the first and second property of the set of pixels and the first property of said pixel;
wherein the color attributes are color coordinates and the first property of the said pixel is the value of the color coordinate that is highest.

12. A method to enhance the contrast of a set of pixels each pixels being characterized by a set of color attributes comprising the steps of:
determining a first property of the set of pixels;
determining a second property of the set of pixels;
determining, for each pixel of the set of pixels, a first property of said pixel; and
modifying the color attributes of each pixel of the set of pixels as a function of the first and second property of the set of pixels and the first property of said pixel;
wherein the color attributes of each pixel of the set of pixels are modified using the following equation $$CA'=CA(L-P_1)/(L(P_2-P_1))$$

where CA' represents the modified color attributes of each pixel, CA represents the color attributes of each pixel, L represents the first property of said pixel, $P_1$ represents the first property of the set of pixels, $P_2$ represents the second property of the set of pixels.

13. A method to enhance the contrast of a set of pixels each pixels being characterized by a set of color attributes comprising the steps of:
determining a first property of the set of pixels;
determining a second property of the set of pixels;
determining, for each pixel of the set of pixels, a first property of said pixel; and
modifying the color attributes of each pixel of the set of pixels as a function of the first and second property of the set of pixels and the first property of said pixel;
wherein the contrast of the set of pixels is enhanced by scaling the range of brightness of the set of pixels to be between a lower limit (LL) and an upper limit (UL);
wherein the color attributes of each pixel of the set of pixels are modified using the following equation $$CA'=(CA/L)((UL-LL)(L-P_1)/(P_2-P_1)+LL)$$

where CA' represents the modified color attributes of each pixel, CA represents the color attributes of each pixel, L represents the first property of said pixel, $P_1$ represents the first property of the set of pixels, and $P_2$ represents the second property of the set of pixels.

14. A method according to claim 13, wherein the LL is greater than 0 and the UL is less than 1.

* * * * *